US010587077B2

(12) United States Patent
Yao

(10) Patent No.: US 10,587,077 B2
(45) Date of Patent: Mar. 10, 2020

(54) CARD SOCKET COMPONENT AND ELECTRONIC DEVICE

(71) Applicant: GUANGDONG OPPO MOBILE TELECOMMUNICATIONS CORP., LTD., Dongguan, Guangdong (CN)

(72) Inventor: Kun Yao, Dongguan (CN)

(73) Assignee: GUANGDONG OPPO MOBILE TELECOMMUNICATION CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/215,749

(22) Filed: Dec. 11, 2018

(65) Prior Publication Data
US 2019/0280432 A1 Sep. 12, 2019

(30) Foreign Application Priority Data

Mar. 7, 2018 (CN) .......................... 2018 1 0184985
Mar. 7, 2018 (CN) ..................... 2018 2 0311359 U

(51) Int. Cl.
H01R 13/639 (2006.01)
H01R 12/71 (2011.01)
(Continued)

(52) U.S. Cl.
CPC ......... H01R 13/639 (2013.01); H01R 12/714 (2013.01); H01R 13/635 (2013.01);
(Continued)

(58) Field of Classification Search
CPC .. H01R 13/639; H01R 13/635; H01R 12/714; H01R 2201/06
(Continued)

(56) References Cited

U.S. PATENT DOCUMENTS 9,077,109 B1 7/2015 Lin et al.
9,125,316 B2 * 9/2015 Hsu ..................... H05K 7/1417
(Continued)

FOREIGN PATENT DOCUMENTS

CN 205194962 U 4/2016
CN 105977668 A 9/2016
(Continued)

OTHER PUBLICATIONS

Supplementary European Search Report in European application No. 18206462.6, dated Jul. 3, 2019.
(Continued)

Primary Examiner — Tulsidas C Patel
Assistant Examiner — Peter G Leigh

(57) ABSTRACT

Disclosed is a card socket component, including a housing, a bearing plate, a cover, an elastic component and a card holder containing a tray and a baffle. The housing has a sliding groove and a through hole, a protrusion is disposed at an end of the sliding groove. The cover and the bearing plate define a receiving space directly facing the through hole. The elastic component is disposed in the receiving space and is configured to provide an opposite elastic force for the tray when the tray arrives at a bottom of the receiving space. A groove is provided on an end side surface of the baffle. When the baffle is at a first staying position, the protrusion is located outside the groove. When the baffle is at a second staying position, the protrusion is received in the groove. Also disclosed is an electronic device.

17 Claims, 12 Drawing Sheets

(51) Int. Cl.
*H01R 13/635* (2006.01)
*H01R 27/02* (2006.01)
*H04B 1/3818* (2015.01)

(52) U.S. Cl.
CPC ........... *H01R 27/02* (2013.01); *H04B 1/3818* (2015.01); *H01R 2201/06* (2013.01); *H01R 2201/16* (2013.01)

(58) Field of Classification Search
USPC .......................................................... 439/68
See application file for complete search history.

(56) References Cited

U.S. PATENT DOCUMENTS

| | | | | |
|---|---|---|---|---|
| 9,246,249 | B2* | 1/2016 | Lee | G06K 7/0056 |
| 9,336,462 | B2* | 5/2016 | Zhang | H04B 1/3816 |
| 9,484,655 | B2* | 11/2016 | Matsunaga | H01R 13/15 |
| 9,658,641 | B2* | 5/2017 | Stephens | H04B 1/38 |
| 9,859,653 | B2* | 1/2018 | Motohashi | H01R 13/635 |
| 2013/0335896 | A1* | 12/2013 | Gao | H05K 7/1461 |
| | | | | 361/679.01 |
| 2014/0099809 | A1* | 4/2014 | Hsu | H01R 13/635 |
| | | | | 439/159 |
| 2014/0177160 | A1* | 6/2014 | Gao | G06F 1/1658 |
| | | | | 361/679.32 |
| 2014/0362548 | A1* | 12/2014 | Liu | G06F 1/16 |
| | | | | 361/754 |
| 2015/0188257 | A1 | 7/2015 | Lin et al. | |
| 2017/0162982 | A1* | 6/2017 | Wu | H04B 1/3816 |
| 2017/0179659 | A1* | 6/2017 | Motohashi | H01R 12/721 |
| 2017/0207591 | A1* | 7/2017 | Chen | H01R 13/6581 |

FOREIGN PATENT DOCUMENTS

| | | |
|---|---|---|
| CN | 106331231 A | 1/2017 |
| CN | 106713556 A | 5/2017 |
| CN | 106888287 A | 6/2017 |
| CN | 206259515 U | 6/2017 |
| CN | 108336525 A | 7/2018 |
| CN | 108471009 A | 8/2018 |
| CN | 108599791 A | 9/2018 |
| CN | 208078230 U | 11/2018 |

OTHER PUBLICATIONS

International Search Report in the international application No. PCT/CN2018/115337, dated Feb. 2, 2019.
Written Opinion of the International Search Authority in the international application No. PCT/CN2018/115337, dated Feb. 2, 2019.

* cited by examiner

CARD SOCKET COMPONENT AND ELECTRONIC DEVICE

CROSS-REFERENCE TO RELATED APPLICATIONS

The present application claims benefit of Chinese Application No. 201820311359.4, filed on Mar. 7, 2018, and Chinese Application No. 201810184985.6, filed on Mar. 7, 2018, the contents of which are hereby incorporated by reference in their entireties.

TECHNICAL FIELD

The present disclosure relates to the field of terminal devices, and more particularly, to a card socket component and an electronic device.

BACKGROUND

An existing mobile phone includes a card socket for carrying an information card. When it is necessary to take out the information card, an auxiliary tool such as a push pin/an ejection pin needs to be inserted into the card socket, so as to take out a card holder and the information card in the card socket, which is inconvenient to operate. If there is no push pin, the card cannot be taken out.

BRIEF DESCRIPTION OF DRAWINGS

In order to describe the technical solutions in the present disclosure more clearly, the drawings required to be used in the embodiments will be simply introduced below. Obviously, the drawings in the following description are only some embodiments of the present disclosure. Those skilled in the art may further obtain other drawings according to the drawings without creative work.

DETAILED DESCRIPTION

Figure 1:
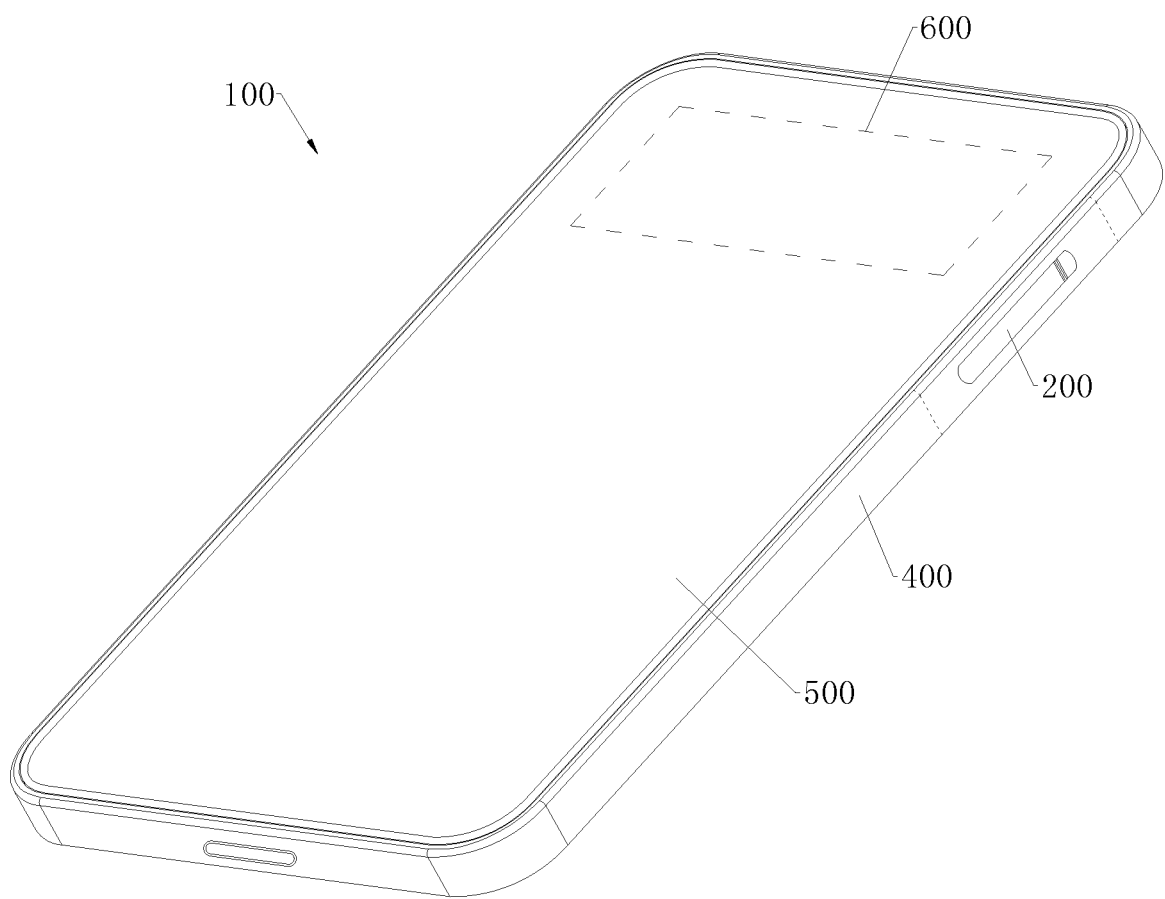
FIG. 1 is a diagram illustrating an electronic device according to an embodiment of the present disclosure.

The technical solutions in the embodiments of the present disclosure are clearly and completely described with reference to the accompanying drawings in the embodiments of the present disclosure hereinafter.

In order to more clearly understand the objectives, features and advantages of the present disclosure, the present disclosure will be described in detail below with reference to the drawings and specific embodiments. It is to be noted that the embodiments of the present disclosure and the features in the embodiments may be combined with each other without conflict.

Many details are elaborated in the following description in order to fully understand the present disclosure. The described embodiments are only a part of the embodiments of the present disclosure rather than all of the embodiments. All other embodiments obtained by those skilled in the art based on the embodiments of the present disclosure without creative efforts fall within the scope of protection of the present disclosure.

In addition, the following explanation of each embodiment refers to illustration of an implementable specific embodiment of the present disclosure with reference to additional drawings. The direction terms mentioned in the present disclosure, such as "length", "width", and "thickness", are only the directions with reference to the additional drawings. Therefore, the used direction terms are intended to better and more clearly illustrate and understand the present disclosure instead of indicating or implying that the device or element must have a specific orientation or must be constructed and operated in a specific orientation, and thus cannot be interpreted as limitation to the present disclosure. Unless otherwise specified and limited, terms "mounting", "mutual connection" and "connection" should be generally understood. For example, they may be a fixed connection, a detachable connection or an integral connection. They may also be a mechanical connection. They may be a direct connection, an indirect connection through an intermediate medium, or internal communication between two elements. Those skilled in the art can understand specific implications of the above terms in the present disclosure in specific situations.

The present disclosure relates to a card socket component, the card socket component includes a housing with a sliding groove and a through hole, a bearing plate fixed inside the housing, a cover mounted on the bearing plate and defining a receiving space with the bearing plate, an elastic component disposed in the receiving space, and a card holder. An end of the sliding groove is provided with a protrusion, and the through hole is provided on a bottom wall of the sliding groove. The receiving space directly faces the through hole. The card holder includes a tray and a baffle, wherein the tray is configured to carry an information card; the elastic component is configured to provide an opposite elastic force for the tray when the tray arrives at a bottom of the receiving space via the through hole; a groove is provided on an end side surface of the baffle, and the baffle is slidably connected to the tray; when the baffle is received in the sliding groove and is at a first staying position with respect to the tray, the protrusion is located outside the groove; and when the baffle is received in the sliding groove and is at a second staying position with respect to the tray, the protrusion is received in the groove.

In at least one embodiment, a direction of moving the baffle between the first staying position and the second staying position may be a sliding direction; wherein the tray may include a tray body and a first sliding plate fixedly connected to the tray body; the tray body may be configured to carry the information card, and the first sliding plate may be parallel to the sliding direction; wherein the baffle may include a baffle body, a second sliding plate and a third sliding plate; the second sliding plate and the third sliding plate may be fixedly connected to a same side of the baffle body, the second sliding plate may be slidably connected to a side of the first sliding plate, and the third sliding plate may be slidably connected to other side of the first sliding plate which is opposite to the side, such that the baffle is movable in the sliding direction with respect to the tray.

In at least one embodiment, a thickness of the first sliding plate may be smaller than a thickness of the tray body so as to form a first avoidance area and a second avoidance area; the first avoidance area may be set on a side of the first sliding plate, the second avoidance area may be set on other side of the first sliding plate which is opposite to the side, the second sliding plate may be received in the first avoidance area, and the third sliding plate may be received in the second avoidance area.

In at least one embodiment, the card socket component may further include a pin, wherein the first sliding plate may be provided with a strip-shaped hole, an extending direction of the strip-shaped hole may be parallel to the sliding direction; the second sliding plate may be provided with a first through hole; the pin may include a first portion and a second portion fixedly connected to the first portion, the first portion may be located in the first through hole to be fixed with respect to the second sliding plate, and the second portion may be located in the strip-shaped hole to be slidably connected to the first sliding plate.

In at least one embodiment, the tray may further include an elastic stopping block, the elastic stopping block may be elastically connected to the first sliding plate, and the elastic stopping block may partially extend into the strip-shaped hole in a telescoping manner, so as to limit a position of the second portion.

In at least one embodiment, the elastic stopping block may include a stopping portion and an elastic portion; the first sliding plate may be provided with a recessed movable groove, the elastic portion may be received in the movable groove, the stopping portion may be partially received in the movable groove and partially received in the strip-shaped hole, and the elastic portion may be elastically connected between the stopping portion and a bottom wall of the movable groove.

In at least one embodiment, the third sliding plate may be provided with a second through hole, and the second through hole may be coaxial with the first through hole; the pin may further include a third portion, the third portion may be connected to a side, away from the first portion, of the second portion, and the third portion may be located in the second through hole.

In at least one embodiment, the pin may further include a positioning portion, and the positioning portion may be connected to a side, away from the second portion, of the first portion; the second sliding plate may be provided with a positioning groove communicated with the first through hole, and the positioning portion may be received in the positioning groove.

In at least one embodiment, the baffle body may include an inner end surface and a peripheral side surface surrounding a periphery of the inner end surface, the first sliding plate and the second sliding plate may be fixed to the inner end surface, the peripheral side surface may include the end side surface, and an extending direction of the groove may be parallel to the sliding direction.

The sliding groove may further include a peripheral sidewall, the peripheral sidewall may surround a periphery of the bottom wall of the sliding groove, the peripheral sidewall of the sliding groove may include an end sidewall, and the protrusion may be fixed to the end sidewall.

In at least one embodiment, the peripheral sidewall of the sliding groove may further include a middle sidewall connected to the end sidewall, the protrusion may extend to the middle sidewall from the end sidewall, and an extending direction of the protrusion may be parallel to the sliding direction.

In at least one embodiment, the protrusion may include a fixed end connected to the end sidewall and a clamping end away from the fixed end, and a cross section area of the protrusion may increase gradually in a direction from the clamping end to the fixed end.

In at least one embodiment, the protrusion may include a fixed end, a connecting segment and a clamping end connected in sequence; the fixed end may be fixedly connected to the end sidewall, a limiting protrusion may be provided at a side surface of the connecting segment, a groove wall of the groove may have a recess area, and the limiting protrusion may be clamped into the recess area when the baffle is at the second staying position.

In at least one embodiment, the peripheral side surface of the baffle body may further include a middle side surface connected to the end side surface, the middle side surface may be provided with a limiting groove, the limiting groove may include a sliding area and an embedding area, the sliding area may extend in the sliding direction, one side of the embedding area may be communicated with the sliding area, and other side of the embedding area may penetrate through the inner end surface.

The peripheral sidewall of the sliding groove may further include a middle sidewall connected to the end sidewall, the middle sidewall may be provided with a limiting block, and the limiting block may enter into or be separated from the sliding area via the embedding area.

In at least one embodiment, the baffle body may further include an outer end surface, the outer end surface and the inner end surface may be disposed back to back, the outer end surface may include a frictional area and a smooth area adjacent to the frictional area, and a surface roughness of the frictional area may be greater than a surface roughness of the smooth area.

In at least one embodiment, the frictional area may be provided with multiple strip-shaped grooves arranged in the sliding direction, and the multiple strip-shaped grooves may be recessed from the outer end surface to the inner end surface.

In at least one embodiment, the elastic component may include an abutting member and an elastic member, the abutting member may be configured to abut against the tray when the tray arrives at the bottom of the receiving space, and the elastic member may be pressed between the abutting member and the cover.

In at least one embodiment, the cover may include a stop block and a stopping wall disposed at an interval, the elastic member may be connected to the stopping wall, and the stop block may be located between the abutting member and the stopping wall.

In at least one embodiment, the bearing plate may be a circuit board, the bearing plate may include a plate body and a conductive elastic piece fixed to the plate body, the conductive elastic piece may be received in the receiving space, and the conductive elastic piece may be configured to electrically connect the information card and the plate body.

In at least one embodiment, the cover may include multiple abutting elastic pieces protruding toward the bearing plate, and the multiple abutting elastic pieces may be configured to press the information card onto the conductive elastic piece.

The present disclosure also relates to an electronic device, and the electronic device includes the card socket component as above.

The present disclosure also relates to another one electronic device, which includes a card socket component, wherein the card socket component includes:

a housing with a sliding groove and a through hole, wherein an end of the sliding groove is provided with a protrusion, and the through hole is provided on a bottom wall of the sliding groove;

a bearing plate, fixed inside the housing;

a cover, mounted on the bearing plate and defining a receiving space with the bearing plate, wherein the receiving space directly faces the through hole;

an elastic component, disposed in the receiving space; and a card holder, including a tray and a baffle, wherein the tray is configured to carry an information card; the elastic component is configured to provide an opposite elastic force for the tray when the tray arrives at a bottom of the receiving space via the through hole; a groove is provided on an end side surface of the baffle, and the baffle is slidably connected to the tray;

when the baffle is locked with respect to the housing, the tray arrives at the bottom of the receiving space via both the sliding groove and the through hole and abuts against the elastic component, and the protrusion is received in the groove;

when the baffle is unlocked with respect to the housing, the tray is pushed away from the receiving space for at least one distance by the elastic component, and the protrusion is located outside the groove.

In at least one embodiment, a direction of moving the baffle between being locked and unlocked with respect to the housing may be a sliding direction; wherein the tray may include a tray body and a first sliding plate fixedly connected to the tray body; the tray body may be configured to carry the information card, and the first sliding plate may be parallel to the sliding direction; wherein the baffle may include a baffle body, a second sliding plate and a third sliding plate; the second sliding plate and the third sliding plate may be fixedly connected to a same side of the baffle body, the second sliding plate may be slidably connected to a side of the first sliding plate, and the third sliding plate may be slidably connected to other side of the first sliding plate which is opposite to the side, such that the baffle may be movable in the sliding direction with respect to the tray.

Figure 2:
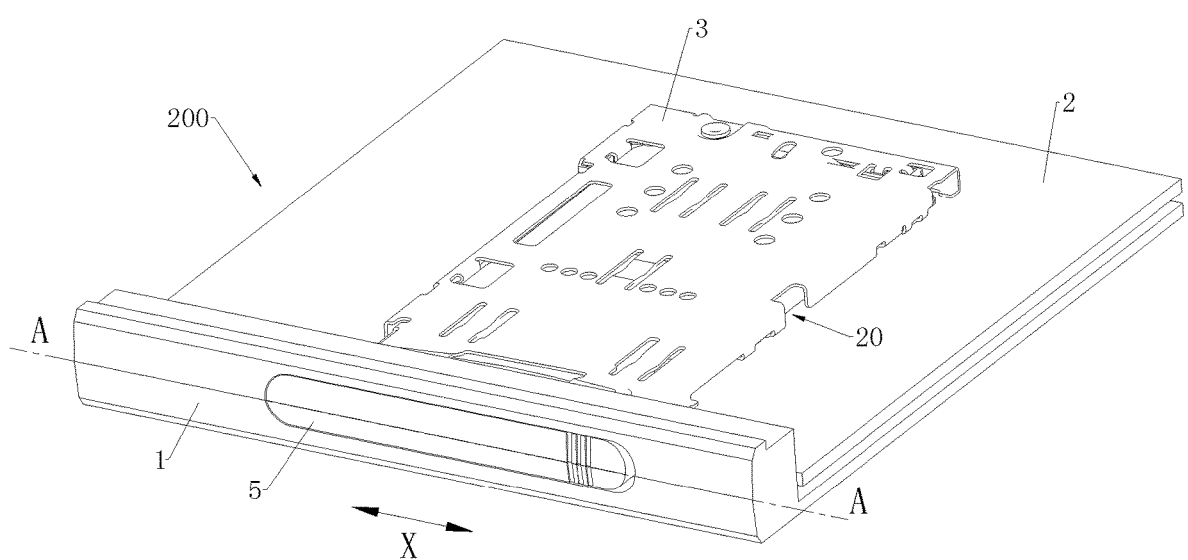
FIG. 2 is a diagram illustrating a card socket component of the electronic device shown in FIG. 1 when carrying an information card.
Figure 3:
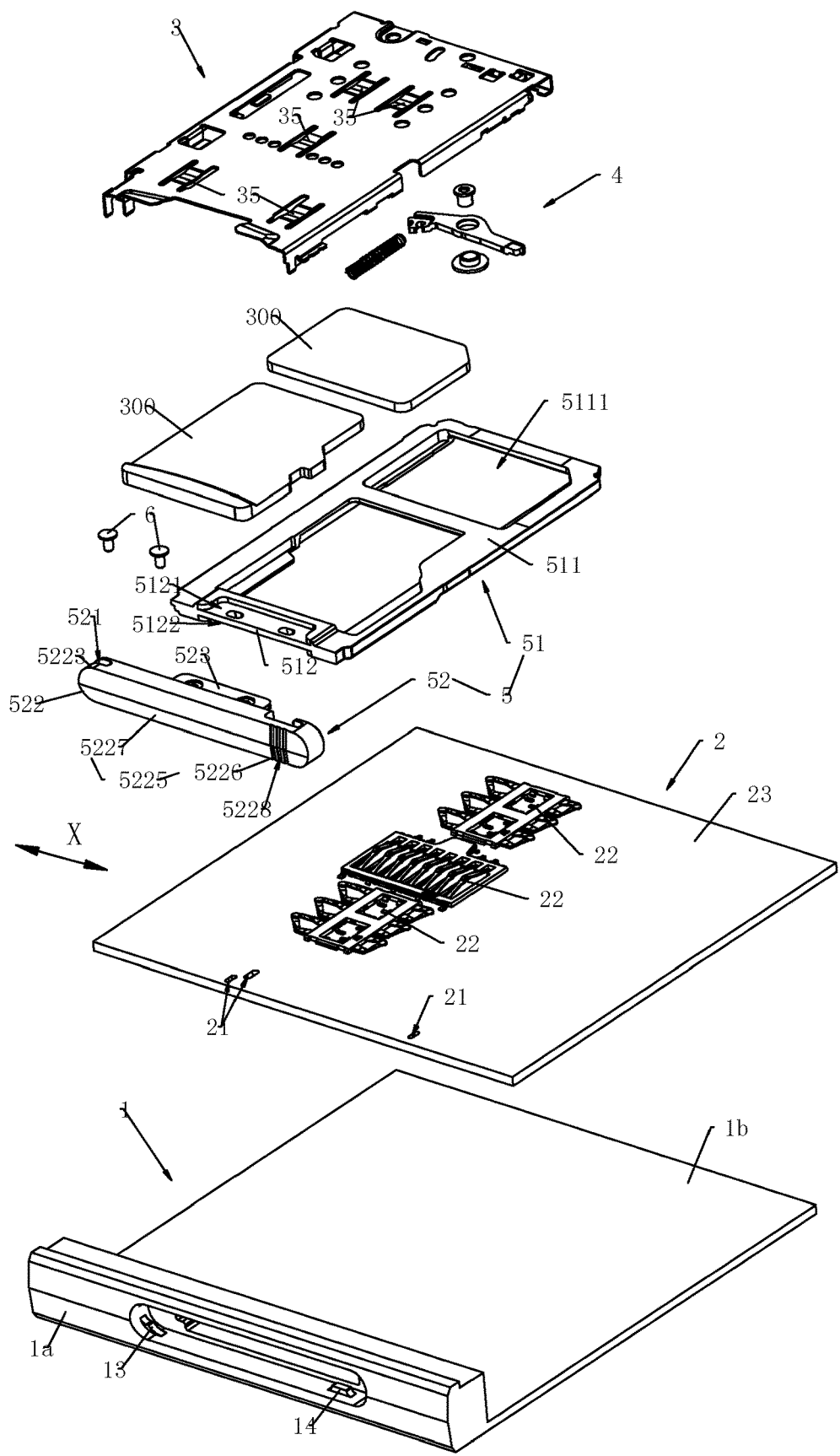
FIG. 3 is an exploded view of a structure shown in FIG. 2.

Referring to FIG. 1 to FIG. 3 together, an electronic device 100 is provided according to an embodiment of the present disclosure. The electronic device 100 may be a tablet computer, a mobile phone, a wearable device or the like. The electronic device 100 includes a card socket component 200. The card socket component 200 is configured to carry an information card 300. The number of information cards 300 carried by the card socket component 200 may be one or plural. The information card 300 includes, but is not limited to, a Subscriber Identification Module (SIM) and a Secure Digital Memory Card (SD).

Referring to FIG. 2 to FIG. 6 together, the card socket component 200 includes a housing 1, a bearing plate 2, a cover 3, an elastic component 4, and a card holder 5. The housing 1 has a sliding groove 11 and a through hole 12. A protrusion 13 is disposed at an end of the sliding groove 11. The through hole 12 is provided on a bottom wall 111 of the sliding groove 11. The sliding groove 11 and the through hole 12 jointly communicate the outside of the housing 1 and the inside of the housing 1. The bearing plate 2 is fixed inside the housing 1. The cover 3 is mounted on the bearing plate 2 and defines a receiving space 20 with the bearing plate 2. The receiving space 20 directly faces the through hole 12. The elastic component 4 is disposed in the receiving space 20. The card holder 5 includes a tray 51 and a baffle 52. The tray 51 is configured to carry an information card 300. The elastic component 4 is configured to provide an opposite elastic force for the tray 51 when the tray 51 arrives at the bottom of the receiving space 20 via the through hole 12. A groove 521 is provided on an end side surface 5223 of the baffle 52. The baffle 52 is slidably connected to/with the tray 51. When the baffle 52 is received in the sliding groove 11 and is at a first staying position with respect to/relative to the tray 51, the protrusion 13 is located outside the groove 521. When the baffle 52 is received in the sliding groove 11 and is at a second staying position with respect to the tray 51, the protrusion 13 is received in the groove 521.

Figure 5:
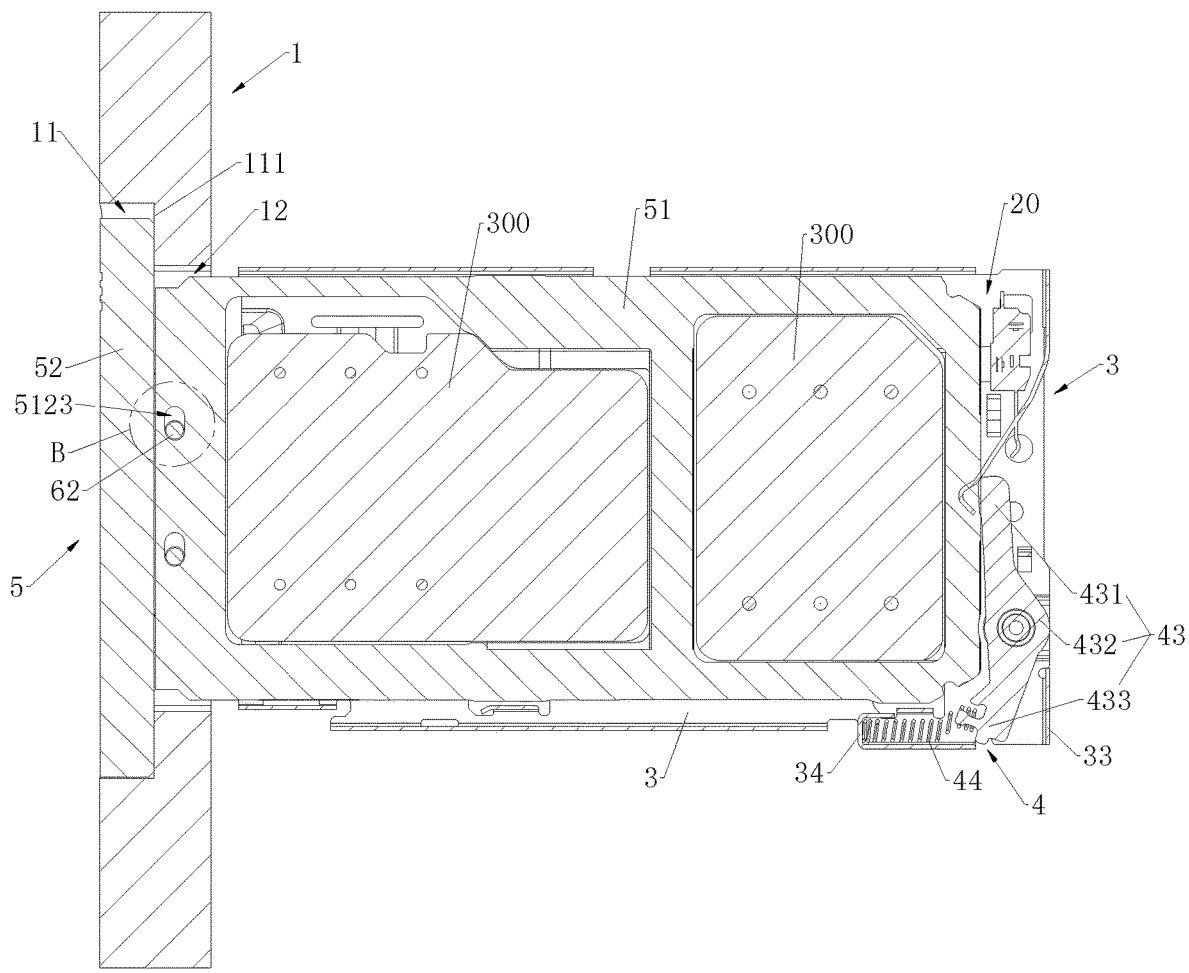
FIG. 5 is a sectional view of the structure shown in FIG. 2 along a line A-A.
Figure 6:
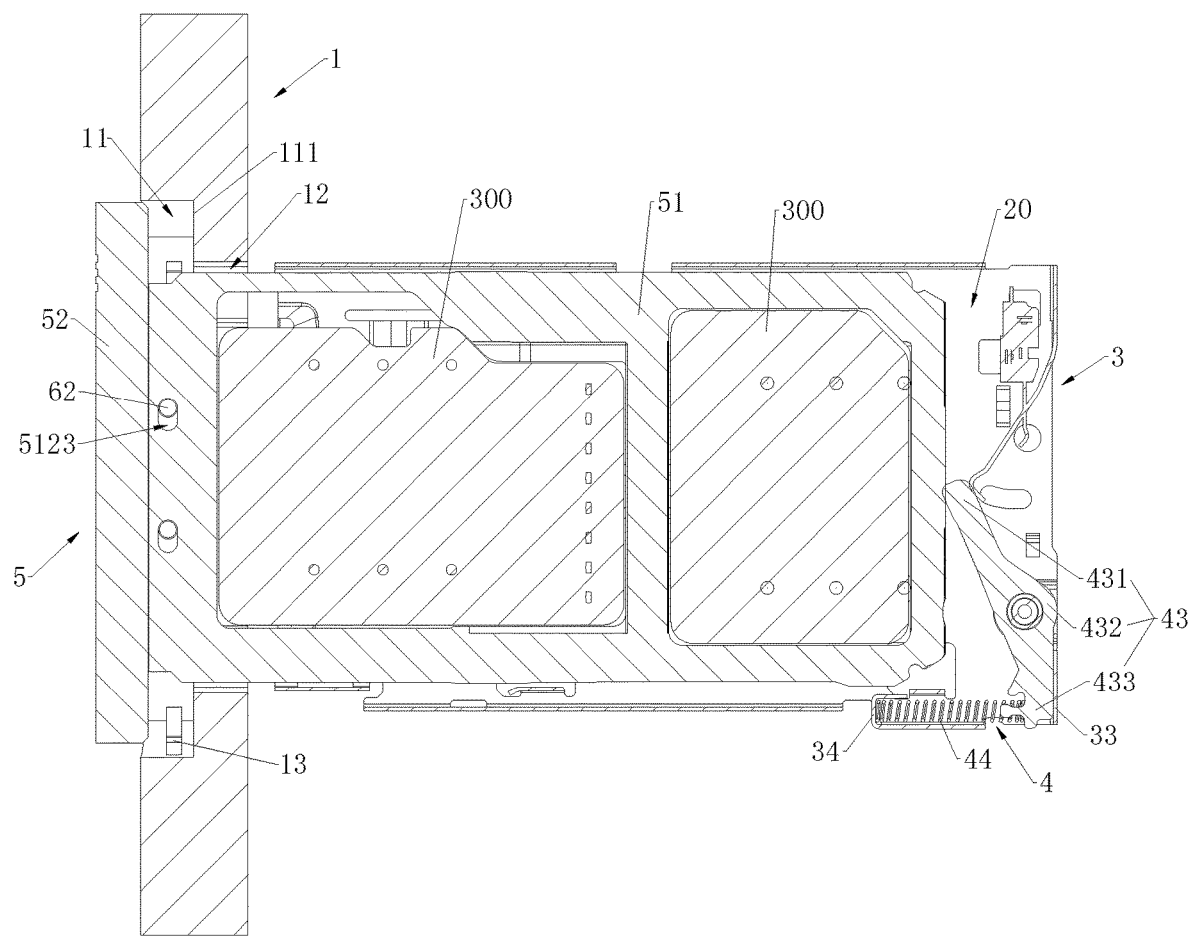
FIG. 6 is a diagram illustrating the structure shown in FIG. 5 under another use state.

When a user needs to mount an information card 300, the user mounts the information card 300 on the tray 51 of the card holder 5 firstly, and then pushes the tray 51 into the receiving space 20 via the sliding groove 11 and the through hole 12, so that the tray 51 arrives at the bottom of the receiving space 20 and abuts against the elastic component 4. At this time, the baffle 52 is received in the sliding groove 11 and is at the first staying position with respect to the tray 51. Then, the baffle 52 is poked/pushed/pulled, so that the baffle 52 slides to the second staying position with respect to the tray 51. As shown in FIG. 5, the protrusion 13 is received in the groove 521, and the baffle 52 is locked and fixed with respect to the housing 1 to complete card mounting. When the user needs to take out the information card 300, the user pokes the baffle 52 to make the baffle 52 slide to the first staying position with respect to the tray 51. The protrusion 13 is located outside the groove 521, and the baffle 52 is unlocked with respect to the housing 1. As shown in FIG. 6, the tray 51 is pushed away from the receiving space 20 for at least one distance by the elastic component 4, and the user takes out the card holder 5 and the information card 300 together by grasping/holding/gripping the baffle 52.

In this embodiment, the baffle 52 is poked to make the card holder 5 locked with respect to the housing 1, and the card holder 5 can be prevented from being separated/detached from the electronic device 100 when the electronic device 100 falls or is hit, thereby improving the reliability of the electronic device 100. By poking the baffle 52, the card holder 5 is unlocked with respect to the housing 1, so that the card holder 5 is separated from the receiving space 20 for at least one distance under the elastic force of the elastic component 4, and the user can take a card out in a semiautomatic manner without an auxiliary tool (such as a push pin), which is easy and convenient to operate. Therefore, the card socket component 200 facilitates the removal of a card, and the electronic device 100 with the card socket component 200 also facilitates the removal of a card.

There may be multiple protrusions 13 and grooves 521 to form multiple groups of clamping structures, thereby increasing the locking force of the baffle 52 and the housing 1. The multiple grooves 521 may run through each other to form an integrated groove structure.

In an embodiment, referring to FIG. 1 and FIG. 2 together, the electronic device 100 includes a rim 400 and a display screen 500, and the periphery of the display screen 500 is connected to the rim 400. The housing 1 may be a part of the rim 400 of the electronic device 100. Or, the housing 1 may also be an individual unit/assembly, and the housing 1 is fixed to the rim 400 of the electronic device 100 by embedding or other assembling manners. The display screen 500 covers the card socket component 200.

In an embodiment, referring to FIG. 2 and FIG. 3 together, the housing 1 includes a frame portion 1a and a fixing portion 1b. The sliding groove 11 and the through hole 12 are provided on the frame portion 1a. The fixing portion 1b is formed inside the frame portion 1a. The frame portion 1a and the fixing portion 1b are substantially L-shaped. The bearing plate 2 may be fixed to the fixing portion 1b. The sliding groove 11 is a substantially strip-shaped groove.

The bearing plate 2 is provided with a fixing hole 21, and the cover 3 partially extends into the fixing hole 21, so as to fix with the bearing plate 2.

Figure 7:
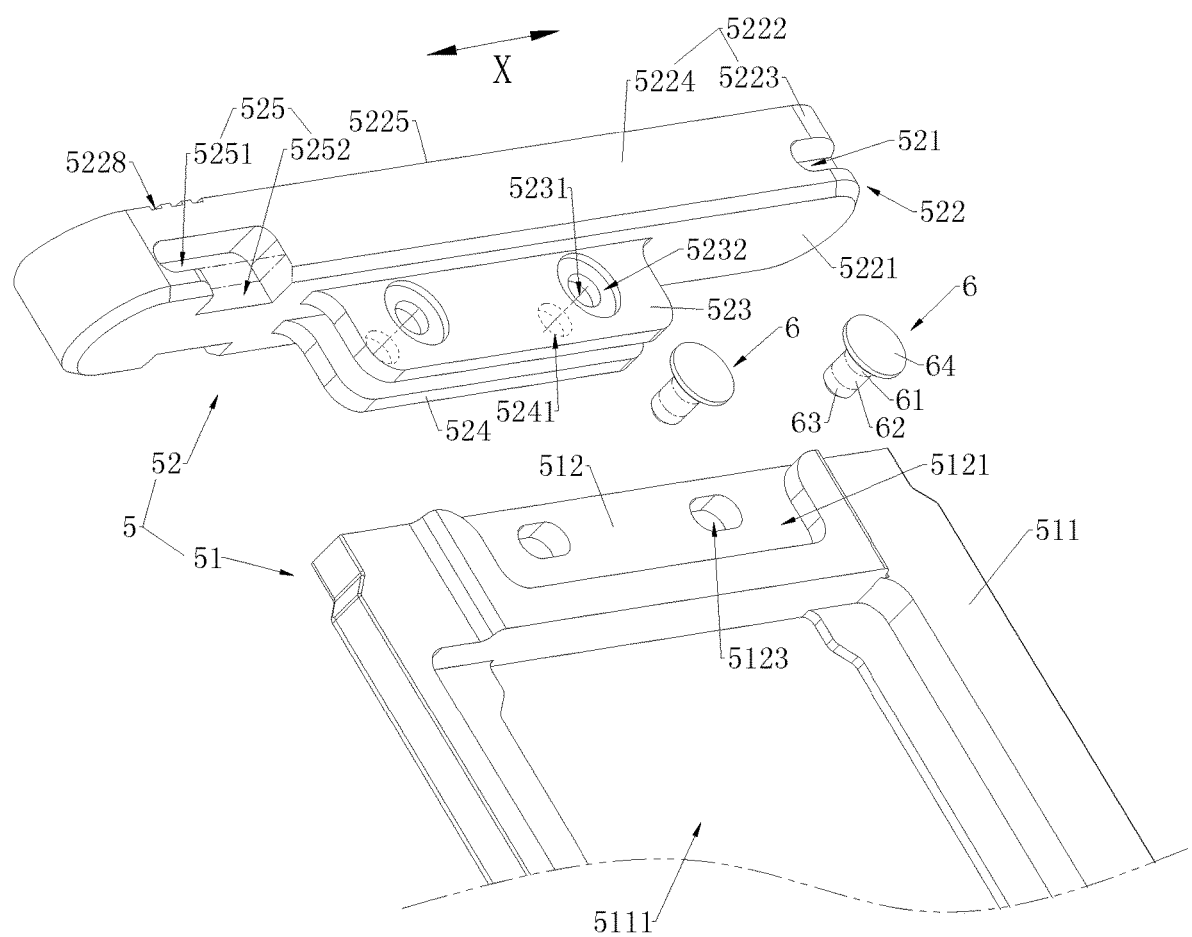
FIG. 7 is a structural diagram illustrating a card holder and a pin shown in FIG. 3.

In an embodiment, referring to FIG. 2, FIG. 3 and FIG. 7 together, the direction of moving the baffle 52 between the first staying position and the second staying position is a sliding direction X. The tray 51 includes a tray body 511 and a first sliding plate 512 fixedly connected to the tray body 511. The first sliding plate 512 is parallel to the tray body 511, or the first sliding plate 512 is substantially parallel to the tray body 511, so that the tray 51 extends into or is separated from the receiving space 20 via the through hole 12. The tray body 511 is configured to carry the information card 300. The tray body 511 is provided with at least one receiving area 5111, and the information card 300 is fixed in the receiving area 5111. The receiving area 5111 is at least partially hollowed, so that a contact terminal on the surface of the information card 300 can be electrically connected to other parts in the card socket component 200. The first sliding plate 512 is parallel to the sliding direction X. The baffle 52 includes a baffle body 522, a second sliding plate 523 and a third sliding plate 524, both the second sliding plate 523 and the third sliding plate 524 are fixedly connected to the same side of the baffle body 522. The second sliding plate 523 and the third sliding plate 524 are slidably connected to two opposite sides of the first sliding plate 512, such that the baffle 52 is movable in the sliding direction X with respect to the tray 51. The second sliding plate 523 and the third sliding plate 524 are parallel to each other, and the surface, in contact with the first sliding plate 512, of the second sliding plate 523 is parallel to the sliding direction X. The surface, in contact with the first sliding plate 512, of the third sliding plate 524 is parallel to the sliding direction X.

The thickness of the first sliding plate 512 is smaller/less than that of the tray body 511, so as to form a first avoidance area 5121 and a second avoidance area 5122 on two opposite sides of the first sliding plate 512. In other words, two sides of the first sliding plate 512 are recessed inwards with respect to the tray body 511, so as to form the first avoidance area 5121 and the second avoidance area 5122 in a recess area 5211. The second sliding plate 523 is received in the first avoidance area 5121, and the third sliding plate 524 is received in the second avoidance area 5122. At this time, the overall thickness of the card holder 5 (the size in a direction perpendicular to the display screen 500) is smaller, so as to facilitate miniaturization and thinning of the card socket component 200 and the electronic device 100.

In an embodiment, referring to FIG. 5 to FIG. 7, the card socket component 200 further includes a pin 6. A strip-shaped hole 5123 is provided on the first sliding plate 512. The extending direction of the strip-shaped hole 5123 is parallel to the sliding direction X. A first through hole 5231 is provided on the second sliding plate 523. The pin 6 includes a first portion 61 and a second portion 62 fixedly connected to the first portion 61. The first portion 61 is located in the first through hole 5231 to be fixed with respect to the second sliding plate 523, and the second portion 62 is located in the strip-shaped hole 5123 to be slidably connected to the first sliding plate 512. At this time, the second sliding plate 523 moves along with the moving track of the pin 6 in the strip-shaped hole 5123. The card socket component 200 is provided with the pin 6, so that the baffle 52 is movable with respect to the tray 51, and cannot be separated from the tray 51.

Figure 8:
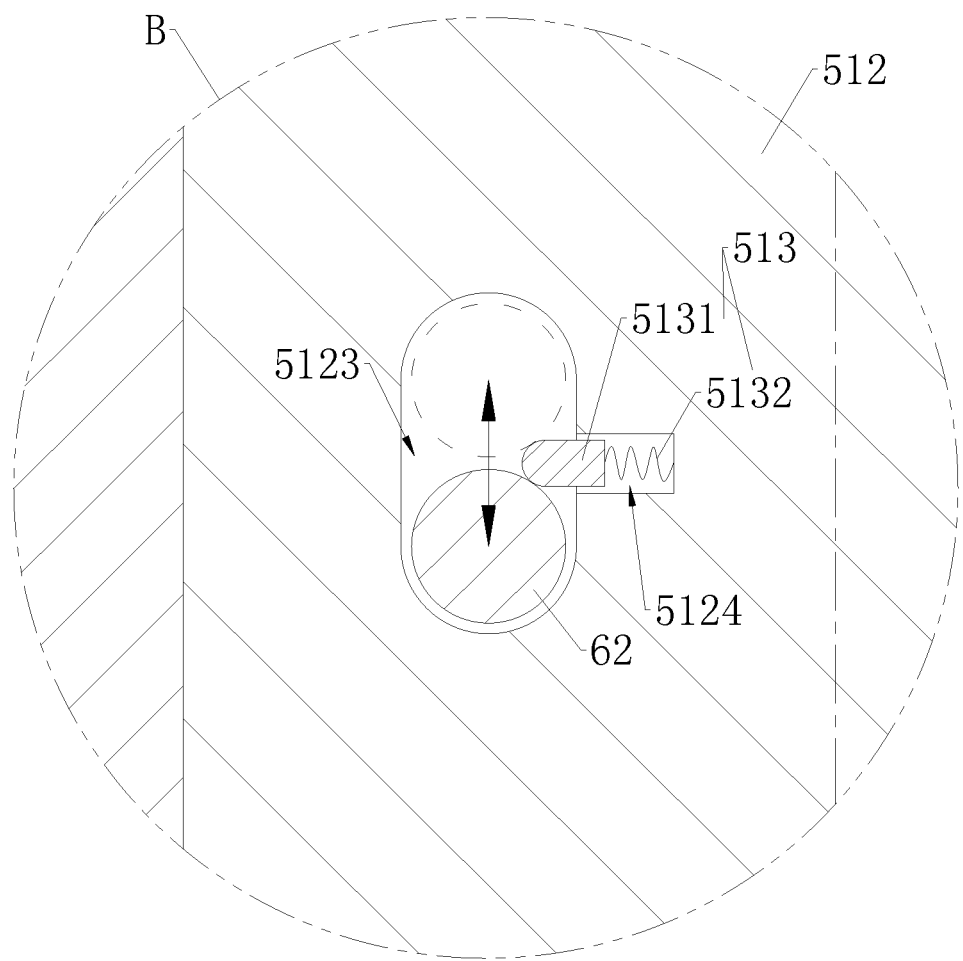
FIG. 8 is a diagram illustrating a B structure in FIG. 5 in another embodiment.

In an embodiment, referring to FIG. 6 to FIG. 8, the tray 51 further includes an elastic stopping block 513. The elastic stopping block 513 is elastically connected to the first sliding plate 512, and the elastic stopping block 513 partially extends into the strip-shaped hole 5123 in a telescoping manner, so as to limit the position of the second portion 62. As shown in FIG. 8, when the baffle 52 slides to the second staying position with respect to the tray 51, the elastic stopping block 513 elastically abuts against the second portion 62 to prevent the second portion 62 from moving in the strip-shaped hole 5123, so that the baffle 52 is prevented from moving with respect to the tray 51, thereby keeping the card holder 5 and the housing 1 in a locked state, and avoiding that the card holder 5 is separated from the housing 1 to improve the reliability of the card socket component 200. When the baffle 52 needs to move with respect to the tray 51 under the action of an external force, the elastic stopping block 513 is pressed to move away from the strip-shaped hole 5123, so that the limiting the position of the second portion 62 is released to make the second portion 62 move. It is understandable that in some embodiments, when the baffle 52 slides to the first staying position with respect to the tray 51, the elastic stopping block 513 also elastically abuts against the second portion 62 to prevent the second portion 62 from moving in the strip-shaped hole 5123, so that the baffle 52 is prevented from moving with respect to the tray 51, thereby keeping the card holder 5 and the housing 1 in an unlocked state, and making the card holder 5 smoothly separated from the housing 1 to improve the reliability of the card socket component 200.

The elastic stopping block 513 includes a stopping portion 5131 and an elastic portion 5132. The first sliding plate 512 is provided with a recessed movable groove 5124. The elastic portion 5132 is received in the movable groove 5124. The stopping portion 5131 is partially received in the movable groove 5124 and partially received in the strip-shaped hole 5123. The elastic portion 5132 is elastically connected between the stopping portion 5131 and a bottom wall of the movable groove 5124. When the stopping portion 5131 is subjected to a pressing force from the second portion 62, the elastic portion 5132 is shrunk, and the stopping portion 5131 moves into the sliding groove 11. When the pressing force exerted on the stopping portion 5131 is reduced, the elastic portion 5132 restores, and the stopping portion 5131 moves out of the sliding groove 11 and extends into the strip-shaped hole 5123 so as to achieve a limiting effect. The elastic portion 5132 may be a spring or elastic rubber.

In an embodiment, referring to FIG. 7, a second through hole 5241 is provided on the third sliding plate 524. The second through hole 5241 is coaxial with the first through hole 5231. The coaxial arrangement means an axially collinear position relationship. The pin 6 further includes a third portion 63, the third portion 63 is connected to a side, away from the first portion 61, of the second portion 62, and the third portion 63 is located in the second through hole 5241. The third portion 63 is coaxial with the first portion 61. The second portion 62 may be coaxial with the first portion 61 or the third portion 63, so that the pin 6 is substantially cylindrical, thereby reducing the processing difficulty and the processing cost. Of course, in other embodiments, the axis of the second portion 62 may also deviate from the axis of the first portion 61 or the axis of the third portion 63, so that a position relationship between the first sliding plate 512 and the second sliding plate 523 or the third sliding plate 524 is more flexible.

In an embodiment, referring to FIG. 7, the pin 6 further includes a positioning portion 64, and the positioning portion 64 is connected to a side, away from the second portion 62, of the first portion 61. The second sliding plate 523 is provided with a positioning groove 5232 communicated with the first through hole 5231, and the positioning portion 64 is received in the positioning groove 5232. At this time, a relative position between the positioning portion 64 and the second sliding plate 523 is limited to avoid the pin 6 from being separated from the baffle 52, so that the baffle 52 can smoothly move with respect to the tray 51.

Figure 4:
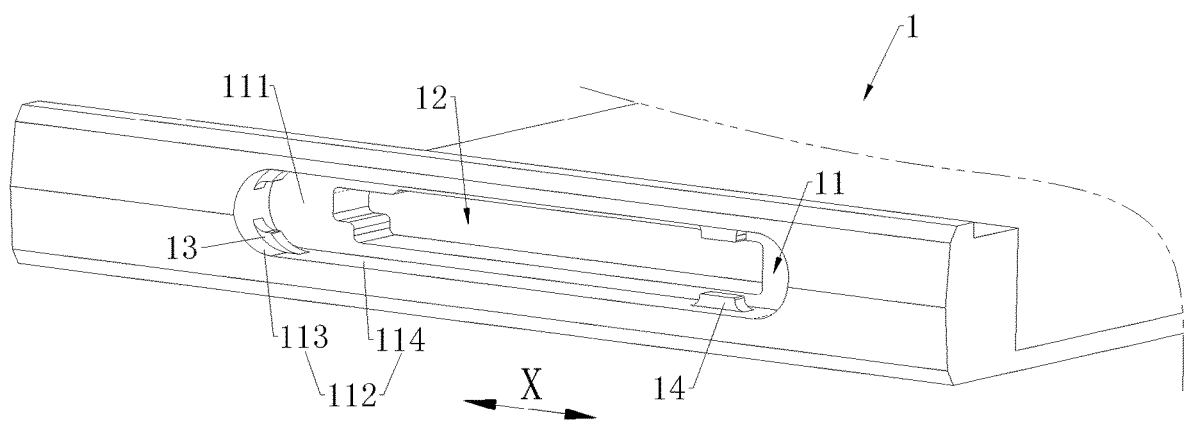
FIG. 4 is a structural diagram illustrating a housing shown in FIG. 3.

In an embodiment, referring to FIG. 3, FIG. 4 and FIG. 7 together, the baffle body 522 includes an inner end surface 5221 and a peripheral side surface 5222 surrounding the periphery of the inner end surface 5221. The inner end surface 5221 faces the tray 51. The first sliding plate 512 and the second sliding plate 523 are fixed to the inner end surface 5221. The peripheral side surface 5222 includes the end side surface 5223. The groove 521 is recessed into the baffle body 522 from the end side surface 5223. The extending direction of the groove 521 is parallel to the sliding direction X. The sliding groove 11 further includes a peripheral sidewall 112 surrounding the periphery of the bottom wall 111 of the sliding groove 11. The peripheral sidewall 112 of the sliding groove 11 includes an end sidewall 113. The protrusion 13 is fixed to the end sidewall 113. The protrusion 13 is integrally formed on the end sidewall 113. In the present embodiment, the moving direction the protrusion 13 with respect to the groove 521 is parallel to the extending direction of the groove 521, therefore the baffle 52 can move in the sliding direction X.

In an embodiment, referring to FIG. 3 and FIG. 4 together, the peripheral sidewall 112 of the sliding groove 11 further includes a middle sidewall 114 connected to the end sidewall 113. The protrusion 13 extends to the middle sidewall 114 from the end sidewall 113. The extending direction of the protrusion 13 is parallel to the sliding direction X. At this time, the protrusion 13 is longer, which facilitates increase of the locking force between the baffle 52 and the housing 1 and prevents the card holder 5 from being separated from the housing 1, so that the reliability of the card socket component 200 is higher.

The friction force between the protrusion 13 and a groove wall of the groove 521 may be increased by various structures as follows.

Figure 9:
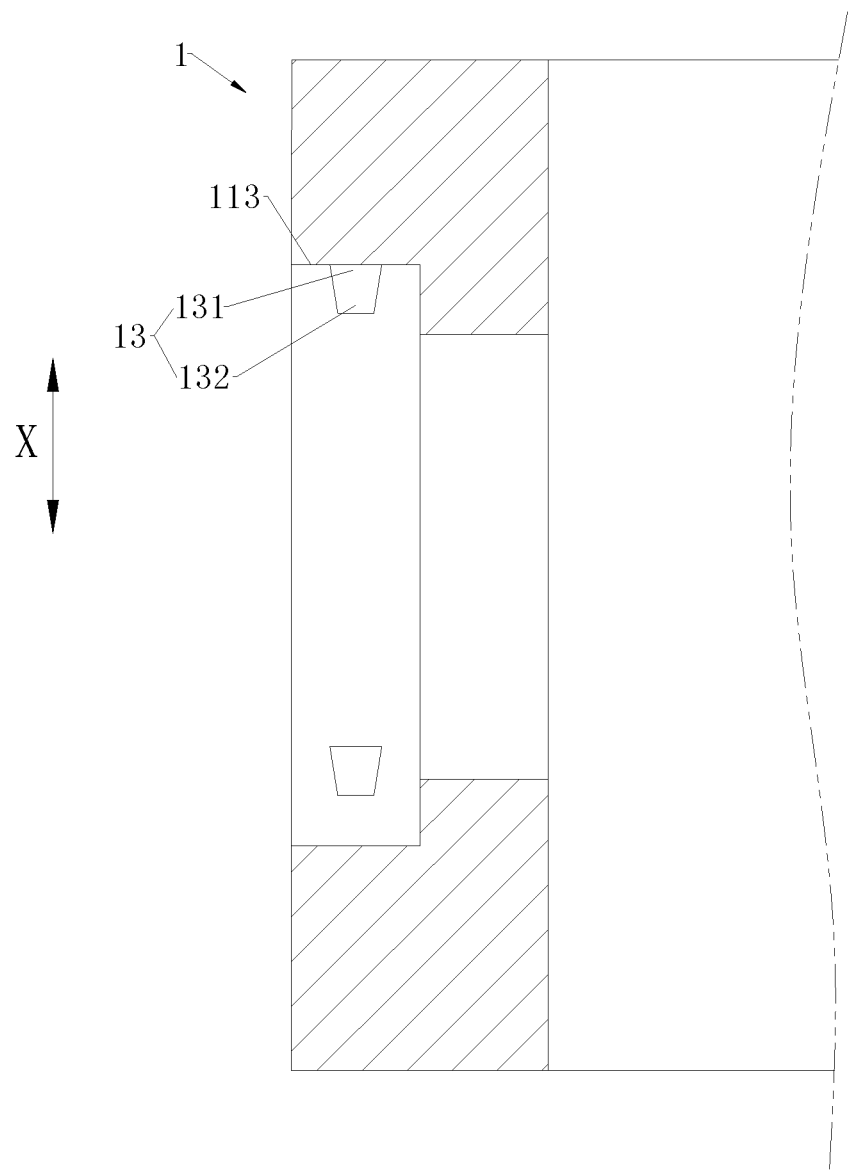
FIG. 9 is a structural diagram illustrating the housing shown in FIG. 3 in another embodiment.

Referring to FIG. 3 and FIG. 9 together, the protrusion 13 includes a fixed end 131 connected to the end sidewall 113 and a clamping end 132 away from the fixed end 131. During extending the protrusion 13 into the groove 521, the clamping end 132 extends into the groove 521 ahead of the fixed end 131. The cross section area of the protrusion 13 increases gradually in the direction from the clamping end 132 to the fixed end 131. The groove 521 is matched with the protrusion 13 in shape. At this time, the protrusion 13 is substantially trapezoidal, and the groove 521 is substantially trapezoidal. The groove wall of the groove 521 is in cone interference fit with the outer wall surface of the protrusion 13, which facilitates increase of the locking force between the protrusion 13 and the groove wall of the groove 521 and prevents the card holder 5 from being separated from the housing 1, so that the reliability of the card socket component 200 is higher.

Figure 10:
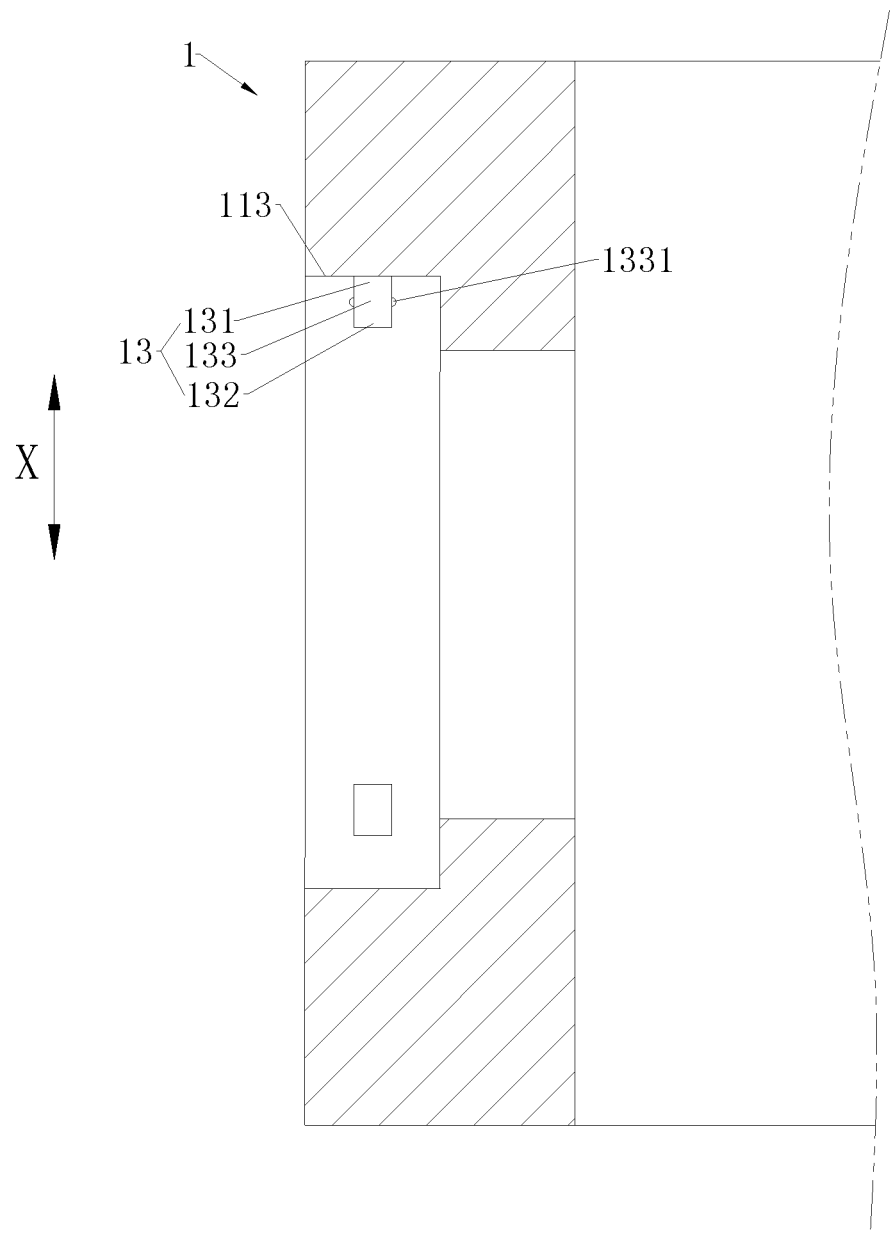
FIG. 10 is a structural diagram illustrating the housing shown in FIG. 3 in yet another embodiment.

Or, referring to FIG. 3 and FIG. 10 together, the protrusion 13 includes a fixed end 131, a connecting segment 133 and a clamping end 132 connected in sequence. The fixed end 131 is fixedly connected to the end sidewall 113. During extending the protrusion 13 into the groove 521, the clamping end 132 extends into the groove 521 ahead of the fixed end 131. A limiting protrusion 1331 is disposed on the side surface of the connecting segment 133. A recess area (not shown in the figure) is provided on the groove wall of the groove 521. When the baffle 52 is at the second staying position, the limiting protrusion 1331 is clamped into the recess area. The limiting protrusion 1331 is in clamping fit with the recess area, so that when the card socket component 200 falls or is hit, the risk of separating the protrusion 13 from the groove 521 is reduced, a locking relationship between the card holder 5 and the housing 1 is firm, and the reliability of the card socket component 200 is higher.

In an embodiment, referring to FIG. 3, FIG. 4 and FIG. 7 together, the peripheral side surface 5222 of the baffle body 522 further includes a middle side surface 5224 connected to the end side surface 5223. The middle side surface 5224 is provided with a limiting groove 525. The limiting groove 525 includes a sliding area 5251 and an embedding area 5252. The sliding area 5251 extends in the sliding direction X. One side of the embedding area 5252 is communicated with the sliding area 5251, and the other side of the embedding area 5252 penetrates through the inner end surface 5221. The peripheral sidewall 112 of the sliding groove 11 further includes a middle sidewall 114 connected to the end sidewall 113. The middle sidewall 114 is provided with a limiting block 14. The limiting block 14 enters into or is separated from the sliding area 5251 via the embedding area 5252.

When the baffle 52 is at the first staying position with respect to the tray 51, the limiting block 14 of the housing 1 is located in the embedding area 5252 or located at a position, aligned with the embedding area 5252, of the sliding area 5251, and the limiting block 14 can be separated from the baffle 52 via the embedding area 5252. When the baffle 52 is at the second staying position with respect to the tray 51, the limiting block 14 is located at a position, staggered from the embedding area 5252, of the sliding area 5251, and the limiting block 14 cannot be separated from the baffle 52 from the embedding area 5252 so as to realize locking.

In an embodiment, referring to FIG. 3 and FIG. 7 together, the baffle body 522 further includes an outer end surface 5225, the outer end surface 5225 and the inner end surface 5221 are disposed back to back. The outer end surface 5225 includes a frictional area 5226 and a smooth area 5227 adjacent to each other, and the surface roughness of the frictional area 5226 is greater than the surface roughness of the smooth area 5227. At this time, the user may press the frictional area 5226 to poke the baffle 52. Since the surface roughness of the frictional area 5226 is higher, the difficulty of user operation is reduced. The arrangement of the smooth area 5227 provides a high appearance consistency between the outer end surface 5225 and the outer surface (the surface away from the inside of the housing 1) of the housing 1, thereby improving the use experience of the card socket component 200 and the electronic device 100. The area of the smooth area 5227 is greater than the area of the frictional area 5226.

The frictional area 5226 is provided with multiple strip-shaped grooves 5228. The multiple strip-shaped grooves 5228 are arranged in the sliding direction X. The arrangement mode of the multiple strip-shaped grooves 5228 can increase the contact area with the user. The multiple strip-shaped grooves 5228 are recessed from the outer end surface 5225 to the inner end surface 5221. The strip-shaped groove 5228 not only can increase the surface roughness of the frictional area 5226, but also cannot hurt hands due to protrusion with respect to the outer end surface 5225, so that the user experience can be improved. The extending direction of the strip-shaped groove 5228 may be substantially perpendicular to the sliding direction X, or may form an acute angle with the sliding direction X.

Of course, in other embodiments, the frictional area 5226 may also be provided with multiple recess points arranged at intervals. The multiple recess points may be distributed in a matrix. Or, the frictional area 5226 may also be provided as a latticed recess area.

Figure 11:
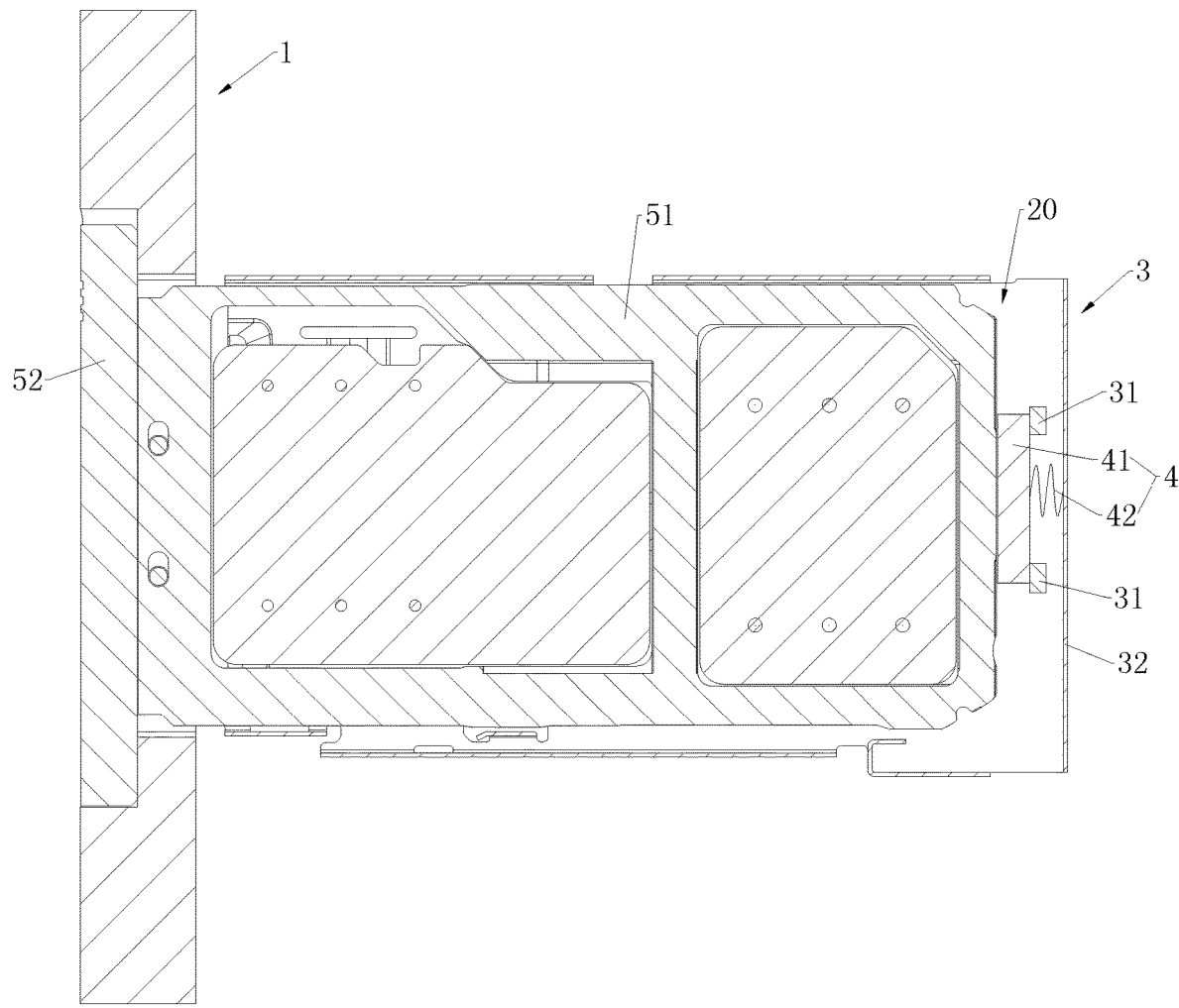
FIG. 11 is a sectional view of the structure shown in FIG. 2 along a line A-A in another embodiment.
Figure 12:
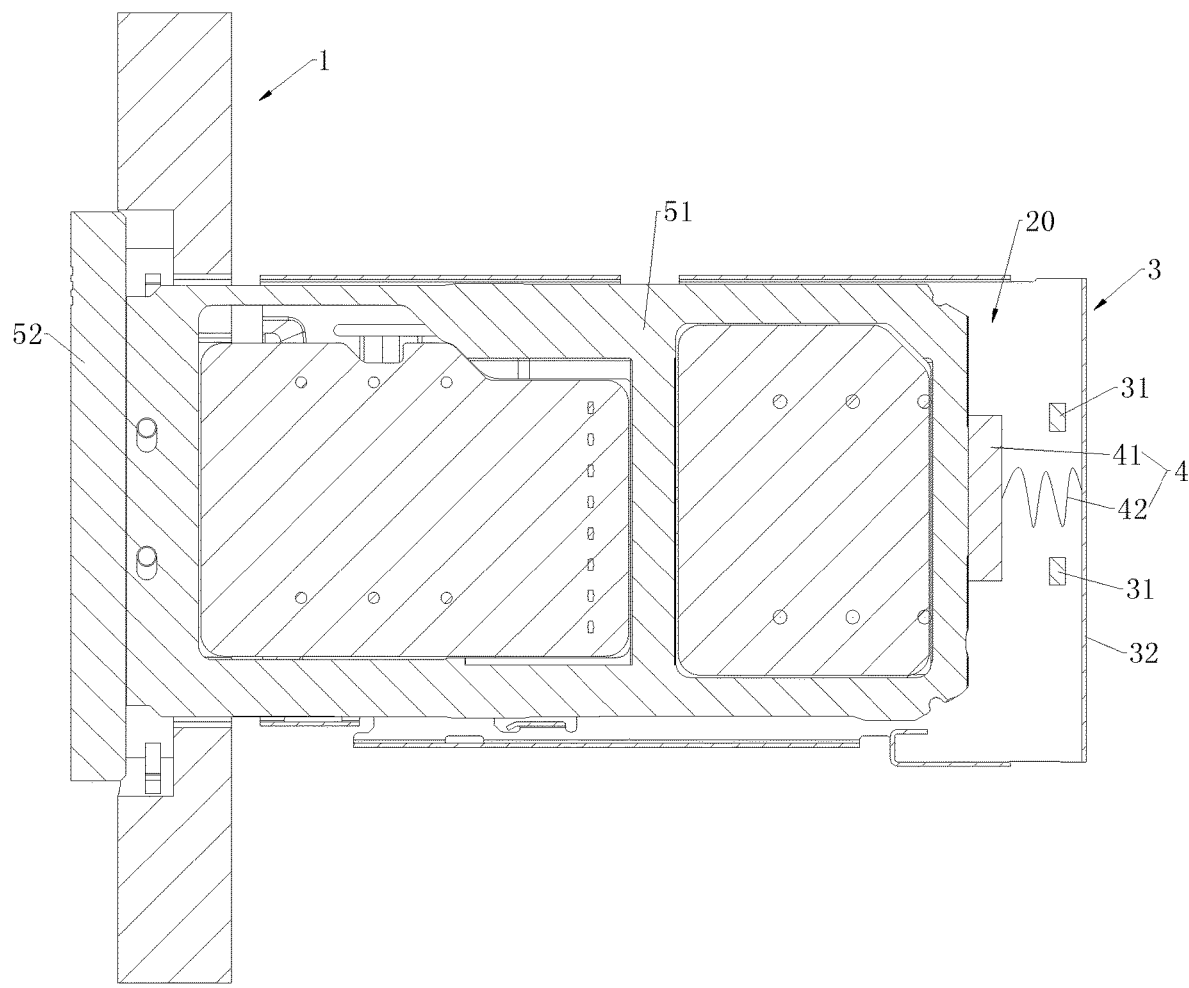
FIG. 12 is a diagram illustrating the structure shown in FIG. 11 under another use state.

In an embodiment, referring to FIG. 11 and FIG. 12 together, the elastic component 4 includes an abutting member 41 and an elastic member 42. The abutting member 41 is configured to abut against the tray 51 when the tray 51 arrives at the bottom of the receiving space 20. The elastic member 42 is pressed between the abutting member 41 and the cover 3. When the baffle 52 is locked with respect to the housing 1, the tray 51 pushes the abutting member 41 to press the elastic member 42, and the elastic member 42 is in a compressed state. When the baffle 52 is unlocked with respect to the housing 1, the abutting member 41 pushes the tray 51 to be separated from the receiving space 20 for at least one distance under the elastic force of the elastic member 42.

The cover 3 includes a stop block 31 and a stopping wall 32 disposed at an interval. The elastic member 42 is connected to the stopping wall 32. The stop block 31 is located between the abutting member 41 and the stopping wall 32. The stop block 31 is configured to prevent the elastic member 42 from failing due to excessive compression of the elastic member 42 by the abutting member 41.

In an embodiment, referring to FIG. 5 and FIG. 6 together, the elastic component 4 includes a rotating shaft rod 43 and an elastic member 44. The rotating shaft rod 43 includes an abutting end 431, a rotating portion 432 and an elastic end 433 connected in sequence. The abutting end 431 is configured to abut against the tray 51 when the tray 51 arrives at the bottom of the receiving space 20. The rotating portion 432 is rotationally connected to the cover 3. The elastic member 44 is pressed between the elastic end 433 and the cover 3. When the baffle 52 is locked with respect to the housing 1, the elastic end 433 presses the elastic member 44, and the elastic member 44 is in a compressed state. When the baffle 52 is unlocked with respect to the housing 1, the abutting end 431 pushes the tray 51 to be separated from the receiving space 20 for at least one distance under the elastic force of the elastic member 44.

The cover 3 includes a first limiting block 33 and a second limiting block 34 opposite to each other. The elastic end 433 is located between the first limiting block 33 and the second limiting block 34, and the elastic member 44 is located between the elastic end 433 and the second limiting block 34. The second limiting block 34 is configured to position the elastic member 44, so that the elastic member 44 can smoothly provide an opposite elastic force. The first limiting block 33 is configured to limit the elastic end 433 to prevent the elastic component 4 from failing due to deviation of the elastic end 433 from a predetermined position under the action of the elastic force.

In an embodiment, referring to FIG. 1 to FIG. 3 together, the bearing plate 2 is a circuit board. The electronic device 100 further includes a main circuit board 600 (also referred to as a motherboard). The main circuit board 600 is located inside the rim 400. The information card 300 on the card socket component 200 is electrically connected to the main circuit board 600. The information card 300 is electrically connected to the main circuit board 600 via the bearing plate 2. A contact terminal on the surface of the information card 300 can be electrically connected to the bearing plate 2, so that the information card 300 is electrically connected to the main circuit board 600 via the circuit board.

The bearing plate 2 includes a plate body 23 and a conductive elastic piece 22 fixed to the plate body 23. The conductive elastic piece 22 is made of a conductive material such as metal. The conductive elastic piece 22 is received in the receiving space 20. The conductive elastic piece 22 is configured to electrically connect the information card 300 and the plate body 23. The conductive elastic piece 22 is deformable, so as to abut against the information card 300 firmly when being pressed, thereby ensuring the steadiness of electrical connection. There may be multiple conductive elastic pieces 22.

The cover 3 includes multiple abutting elastic pieces 35. The multiple abutting elastic pieces 35 are deformable. The multiple abutting elastic pieces 35 protrude toward the bearing plate 2, and the multiple abutting elastic pieces 35 are configured to press the information card 300 onto the conductive elastic piece 22. The multiple abutting elastic pieces 35 and the conductive elastic piece 22 jointly clamp the information card 300, so as to fix the information card 300 in the receiving space 20, thereby ensuring the reliability of the card socket component 200.

The above is the alternative embodiment of the present disclosure. It should be pointed out that those skilled in the art may also make several improvements and modifications without departing from the principle of the present disclosure. These improvements and modifications fall within the scope of protection of the present disclosure.

The invention claimed is:

1. A card socket component, comprising:
   a housing with a sliding groove and a through hole, wherein an end of the sliding groove is provided with a protrusion, and the through hole is provided on a bottom wall of the sliding groove;
   a bearing plate, fixed inside the housing;
   a cover, mounted on the bearing plate and defining a receiving space with the bearing plate, wherein the receiving space directly faces the through hole;
   an elastic component, disposed in the receiving space; and
   a card holder, comprising a tray and a baffle, wherein the tray is configured to carry an information card; the elastic component is configured to provide an opposite elastic force for the tray when the tray arrives at a bottom of the receiving space via the through hole; a groove is provided on an end side surface of the baffle, and the baffle is slidably connected to the tray; when the baffle is received in the sliding groove and is at a first staying position with respect to the tray, the protrusion is located outside the groove; and when the baffle is received in the sliding groove and is at a second staying position with respect to the tray, the protrusion is received in the groove;

wherein a direction of moving the baffle between the first staying position and the second staying position is a sliding direction; wherein the tray comprises a tray body and a first sliding plate fixedly connected to the tray body; the tray body is configured to carry the information card, and the first sliding plate is parallel to the sliding direction; wherein the baffle comprises a baffle body, a second sliding plate and a third sliding plate; the second sliding plate and the third sliding plate are fixedly connected to a same side of the baffle body, the second sliding plate is slidably connected to a side of the first sliding plate, and the third sliding plate is slidably connected to other side of the first sliding plate which is opposite to the side, such that the baffle is movable in the sliding direction with respect to the tray.

2. The card socket component according to claim 1, wherein a thickness of the first sliding plate is smaller than a thickness of the tray body so as to form a first avoidance area and a second avoidance area; the first avoidance area is set on a side of the first sliding plate, the second avoidance area is set on other side of the first sliding plate which is opposite to the side, the second sliding plate is received in the first avoidance area, and the third sliding plate is received in the second avoidance area.

3. The card socket component according to claim 1, further comprising a pin, wherein the first sliding plate is provided with a strip-shaped hole, an extending direction of the strip-shaped hole is parallel to the sliding direction; the second sliding plate is provided with a first through hole; the pin comprises a first portion and a second portion fixedly connected to the first portion, the first portion is located in the first through hole to be fixed with respect to the second sliding plate, and the second portion is located in the strip-shaped hole to be slidably connected to the first sliding plate.

4. The card socket component according to claim 3, wherein the tray further comprises an elastic stopping block, the elastic stopping block is elastically connected to the first sliding plate, and the elastic stopping block partially extends into the strip-shaped hole in a telescoping manner, so as to limit a position of the second portion.

5. The card socket component according to claim 4, wherein the elastic stopping block comprises a stopping portion and an elastic portion; the first sliding plate is provided with a recessed movable groove, the elastic portion is received in the movable groove, the stopping portion is partially received in the movable groove and partially received in the strip-shaped hole, and the elastic portion is elastically connected between the stopping portion and a bottom wall of the movable groove.

6. The card socket component according to claim 3, wherein the pin further comprises a positioning portion, and the positioning portion is connected to a side, away from the second portion, of the first portion; the second sliding plate is provided with a positioning groove communicated with the first through hole, and the positioning portion is received in the positioning groove.

7. The card socket component according to claim 1, wherein the protrusion comprises a fixed end connected to the sliding groove and a clamping end away from the fixed end, and a cross section area of the protrusion increases gradually in a direction from the clamping end to the fixed end.

8. The card socket component according to claim 1, wherein the protrusion comprises a fixed end, a connecting segment and a clamping end connected in sequence; the fixed end is fixedly connected to the sliding groove, a limiting protrusion is provided at a side surface of the connecting segment, a groove wall of the groove has a recess area, and the limiting protrusion is clamped into the recess area when the baffle is at the second staying position.

9. An electronic device, comprising a card socket component, wherein the card socket component comprises:
a housing with a sliding groove and a through hole, wherein an end of the sliding groove is provided with a protrusion, and the through hole is provided on a bottom wall of the sliding groove;
a bearing plate, fixed inside the housing;
a cover, mounted on the bearing plate and defining a receiving space with the bearing plate, wherein the receiving space directly faces the through hole;
an elastic component, disposed in the receiving space; and
a card holder, comprising a tray and a baffle, wherein the tray is configured to carry an information card; the elastic component is configured to provide an opposite elastic force for the tray when the tray arrives at a bottom of the receiving space via the through hole; a groove is provided on an end side surface of the baffle, and the baffle is slidably connected to the tray; when the baffle is received in the sliding groove and is at a first staying position with respect to the tray, the protrusion is located outside the groove; and when the baffle is received in the sliding groove and is at a second staying position with respect to the tray, the protrusion is received in the groove;
wherein a direction of moving the baffle between the first staying position and the second staying position is a sliding direction; wherein the tray comprises a tray body and a first sliding plate fixedly connected to the tray body; the tray body is configured to carry the information card, and the first sliding plate is parallel to the sliding direction; wherein the baffle comprises a baffle body, a second sliding plate and a third sliding plate; the second sliding plate and the third sliding plate are fixedly connected to a same side of the baffle body, the second sliding plate is slidably connected to a side of the first sliding plate, and the third sliding plate is slidably connected to other side of the first sliding plate which is opposite to the side, such that the baffle is movable in the sliding direction with respect to the tray.

10. The electronic device according to claim 9, further comprising a pin, wherein the first sliding plate is provided with a strip-shaped hole, an extending direction of the strip-shaped hole is parallel to the sliding direction; the second sliding plate is provided with a first through hole; the pin comprises a first portion and a second portion fixedly connected to the first portion, the first portion is located in the first through hole to be fixed with respect to the second sliding plate, and the second portion is located in the strip-shaped hole to be slidably connected to the first sliding plate.

11. The electronic device according to claim 10, wherein the tray further comprises an elastic stopping block, the elastic stopping block is elastically connected to the first sliding plate, and the elastic stopping block partially extends into the strip-shaped hole in a telescoping manner, so as to limit a position of the second portion.

12. The electronic device according to claim 11, wherein the elastic stopping block comprises a stopping portion and an elastic portion; the first sliding plate is provided with a recessed movable groove, the elastic portion is received in the movable groove, the stopping portion is partially received in the movable groove and partially received in the strip-shaped hole, and the elastic portion is elastically connected between the stopping portion and a bottom wall of the movable groove.

13. The electronic device according to claim 10, wherein the pin further comprises a positioning portion, and the positioning portion is connected to a side, away from the second portion, of the first portion; the second sliding plate is provided with a positioning groove communicated with the first through hole, and the positioning portion is received in the positioning groove.

14. The electronic device according to claim 9, wherein a thickness of the first sliding plate is smaller than a thickness of the tray body so as to form a first avoidance area and a second avoidance area; the first avoidance area is set on a side of the first sliding plate, the second avoidance area is set on other side of the first sliding plate which is opposite to the side, the second sliding plate is received in the first avoidance area, and the third sliding plate is received in the second avoidance area.

15. The electronic device according to claim 9, wherein the protrusion comprises a fixed end connected to the sliding groove and a clamping end away from the fixed end, and a cross section area of the protrusion increases gradually in a direction from the clamping end to the fixed end.

16. The electronic device according to claim 9, wherein the protrusion comprises a fixed end, a connecting segment and a clamping end connected in sequence; the fixed end is fixedly connected to the sliding groove, a limiting protrusion is provided at a side surface of the connecting segment, a groove wall of the groove has a recess area, and the limiting protrusion is clamped into the recess area when the baffle is at the second staying position.

17. An electronic device, comprising a card socket component, wherein the card socket component comprises:
   a housing with a sliding groove and a through hole, wherein an end of the sliding groove is provided with a protrusion, and the through hole is provided on a bottom wall of the sliding groove;
   a bearing plate, fixed inside the housing;
   a cover, mounted on the bearing plate and defining a receiving space with the bearing plate, wherein the receiving space directly faces the through hole;
   an elastic component, disposed in the receiving space; and
   a card holder, comprising a tray and a baffle, wherein the tray is configured to carry an information card; the elastic component is configured to provide an opposite elastic force for the tray when the tray arrives at a bottom of the receiving space via the through hole; a groove is provided on an end side surface of the baffle, and the baffle is slidably connected to the tray;
   when the baffle is locked with respect to the housing, the tray arrives at the bottom of the receiving space via both the sliding groove and the through hole and abuts against the elastic component, and the protrusion is received in the groove;
   When the baffle is unlocked with respect to the housing, the tray is pushed away from the receiving space for at least one distance by the elastic component, and the protrusion is located outside the groove;
   wherein a direction of moving the baffle between being locked and unlocked with respect to the housing is a sliding direction; wherein the tray comprises a tray body and a first sliding plate fixedly connected to the tray body; the tray body is configured to carry the information card, and the first sliding plate is parallel to the sliding direction; wherein the baffle comprises a baffle body, a second sliding plate and a third sliding plate; the second sliding plate and the third sliding plate are fixedly connected to a same side of the baffle body, the second sliding plate is slidably connected to a side of the first sliding plate, and the third sliding plate is slidably connected to other side of the first sliding plate which is opposite to the side, such that the baffle is movable in the sliding direction with respect to the tray.

* * * * *